United States Patent [19]

Fuchs et al.

[11] Patent Number: 4,975,194

[45] Date of Patent: Dec. 4, 1990

[54] PROCESS FOR THE DISINFECTION OF SEWAGE SLUDGE

[76] Inventors: Leonhard Fuchs; Martin Fuchs, both of Im Stocktal 2, 5440, Mayen 1, Fed. Rep. of Germany

[21] Appl. No.: 340,793

[22] Filed: Apr. 20, 1989

[30] Foreign Application Priority Data

Apr. 23, 1988 [DE] Fed. Rep. of Germany ....... 3813844

[51] Int. Cl.$^5$ .......................... C02F 3/00; C02F 11/02
[52] U.S. Cl. ..................................... 210/604; 210/612; 210/758; 210/764; 210/766
[58] Field of Search ............... 210/612, 603, 604, 630, 210/758, 764, 766, 180

[56] References Cited

U.S. PATENT DOCUMENTS

| | | | |
|---|---|---|---|
| 3,670,887 | 6/1972 | McWhirter | 210/604 |
| 3,926,794 | 12/1975 | Vahldieck | 210/604 |
| 4,029,574 | 6/1977 | Reimann | 210/604 |
| 4,132,637 | 1/1979 | Key et al. | 210/604 |
| 4,178,239 | 12/1979 | Lowther | 210/604 |
| 4,246,099 | 1/1981 | Gould et al. | 210/630 |
| 4,276,174 | 6/1981 | Breider et al. | 210/630 |
| 4,493,770 | 1/1985 | Moilliet | 210/604 |

FOREIGN PATENT DOCUMENTS 053777 11/1981 European Pat. Off. .

OTHER PUBLICATIONS

G.M.F. Wasser Abwasser, Jan. 1984, "Das Gas und Wasserfach".
G. W. F. Wasser Abwasser, Sep. 1986, pp. 442–448, "Neue Einsatzbereiche fur . . . .", Klaus Breitenbucher.
Korrespondenz Abwasser, Jan. 1988, pp. 71–74, "Entseuchung von Klarschlamm".
Korrespondenz Abwasser, "Zweistufige Aerob-Thermophil/Anaerobe . . . ", J. Jakob et al., 1987.

*Primary Examiner*—Richard V. Fisher
*Assistant Examiner*—Cynthia L. Nessler
*Attorney, Agent, or Firm*—Wegner, Cantor, Mueller & Player

[57] ABSTRACT

The process for the disinfection of sewage sludge prior to introducing same into an anaerobic sewage sludge processing step involving the recovery of methane gas by heating the sewage sludge in a preceding disinfection step at from 50° C. to 70° C., and preferably at from 55° C. to 65° C., for a period of from 1 to 72 hours, and preferably of from 12 to 36 hours, while throughly mixing the sewage sludge with an oxygen-containing gas is carried out by using, as the oxygen-containing gas, a mixture comprising from 10 to 70% by volume of fresh air and 30 to 90% by volume of vent gas from the disinfection step, the oxygen contents of the gas mixture being maintained within the range of from 5 to 15% by volume, and preferably of from 7 to 12% by volume.

8 Claims, No Drawings

PROCESS FOR THE DISINFECTION OF SEWAGE SLUDGE

The present invention relates to a process for the disinfection of sewage sludge prior to introducing same into an anaerobic sewage sludge processing step involving the recovery of methane gas by heating the sewage sludge in a preceding disinfection step at from 50° C. to 70° C., and preferably at from 55° C. to 65° C., for a period of from 1 to 72 hours, and preferably of from 12 to 36 hours, while thoroughly mixing the sewage sludge with an oxygen-containing gas.

A generic process has been described in "Korrespondenz Abwasser", 34th year, issue No 4/1987 pages 331 to 338. In the process described therein the disinfection is carried out in the first aerobic thermophilic process stage, optimum results having been achieved at a residence time of the sewage sludge in the first stage of between 12 and 24 hours and at a temperature of between 55° C. and 62°C. As the oxygen-containing gas there has been employed the oxygen of the air which is thoroughly mixed with the sewage sludge by introducing the fresh air through a highly efficient ejector aerator. As ejector aerators, more specifically, Applicants' helical aerators and circulating aerators have proven to be particularly useful. Moreover, this system includes a foam control system, namely the foam cutter marketed by Applicants.

Although the above process has proven to be both economic and reliable, it was intended to attempt to further improve the flexibility and economy of the process, under the dominating aspect of warranting a reliable disinfection, even under varying load and varying composition of the supplied sewage sludge which mostly consists of a mixture, comprising primary and/or excess sludge. Furthermore, it is to be observed that reliable disinfection is accomplished not only by heating to temperatures of from 50° C. to 70° C. for a sufficient period of time, but also by metabolizing the mostly mesophilic infectious germs by means of the thermophilic microorganisms fast growing in the disinfection stage. More specifically, upon disturbance of growth of these thermophilic microorganisms care must be taken that residence time, temperature and growth conditions can be adjusted to the requirements of the situation.

It was now found that said object can be attained in a particular easy and economical manner by employing, as the oxygen-containing gas, a mixture comprising from 10 to 70% by volume of fresh air and 30 to 90% by volume of vent gas from the disinfection step, the oxygen contents of the gas mixture being maintained within the range of from 5 to 15% by volume, and preferably of from 7 to 12% by volume.

Under these process conditions it is readily possible to extend the residence time in the disinfection stage without any occurrence of an undesirable increased decomposition of the sewage sludge due to a decrease in the proportion of fresh air. If, however, the residence time of the sewage sludge in the disinfection step in turn is to be reduced, then the fresh air proportion is increased again. In the same manner there may be responded to variations in temperature and, more particularly, to variations in growth of the thermophilic microorganisms, while the oxygen content should not fall below 5% by volume, because otherwise an anaerobic process would be initiated. Under anaerobic conditions great changes of the pH values may occur, and the growth of the aerobic thermophilic microorganisms may become greatly disturbed.

The re-use according to the invention of a considerable part of the waste gas from the disinfection stage in the gas treatment of the sewage sludge also positively affects the heat balance, since less fresh air is introduced into the system and, thus, less heat is removed from the system with the vent gases.

The temperature in the disinfection step is mostly maintained by a heat exchange between the sludge which is already disinfected and the fresh batch of raw sludge. Furthermore, the disinfection unit should be provided with an external heating source which is preferably operated with burnt methane derived from the anaerobic sewage sludge processing step. Eventually, heat is further generated by the metabolism of the thermophilic microorganisms in the disinfection stage. The heat losses are kept rather low with use of a good heat insulation of the disinfection unit. They are still further reduced due to the re-use, according to the invention of the waste gases produced in this step.

The disinfected sewage sludge, after having been cooled in the heat exchanger, is directly pumped into the anaerobic sewage sludge processing reactor, for which step it mostly has already an optimum temperature level of from 30° C. to 40°C. Instead of the conventional indirect heating applied to anaerobic sewage sludge processing in the sludge-digestion tower, according to the invention, it is mostly sufficient to apply direct heat by means of the addition of warm sewage sludge from the disinfection step.

The process according to the invention is more readily controlled by parameters which are easy to measure, namely the residence time in the disinfection stage, the temperature in the disinfection stage and the oxygen content in the gaseous phase of the disinfection step, while the mixing ratio between fresh air and recycled vent gas will have to be altered only if the oxygen content has exceeded or fallen below the critical values.

These measures may be readily and reliably automated so as to require little maintenance work. Thus, the expenditure for staff may be kept extraordinarily low, while a safe disinfection is ensured over long periods of time. Thus, the oxygen content of the gaseous phase may be measured readily and without trouble, whereas so far it has not been possible to continuously measure the oxygen content of the liquid phase. Although the oxygen content of the liquid phase is important for preventing anaerobic processes from taking place, according to the invention the measurement of this parameter is dispensable.

The process of the invention is suitable not only for sewage plants to be newly constructed, but may also be used without problems in existing sewage plants with an anaerobic sewage sludge processing stage. Thereby, the efficiency, stability and capacity is also enhanced, so that the total cost, in spite of the preceding disinfection stage being newly added, will only be insignificantly changed. It will be appreciated that reliable disinfection, even under varying operating conditions, constitutes a high value which cannot be evaluated alone under the aspects of capital expenses and subsequents costs.

We claim:

1. A process for disinfection of sewage sludge prior to introducing said sewage sludge into an anaerobic sewage sludge processing step providing recovery of methane gas, said process comprising a disinfection step wherein the sewage sludge is heated at a temperature of 50° C. to 70° C., for a residence time of from 1 to 72 hours, while the sewage sludge is thoroughly mixed with an oxygen-containing gas,
  wherein the oxygen-containing gas is a gas mixture comprising from 10 to 70% by volume of fresh air and 30 to 90% by volume of vent gas from the disinfection step, the oxygen content of the gas mixture being maintained within the range from 5 to 15% by volume, and
  wherein the process is controlled by measurement and variance of the temperature, the residence time, and the oxygen content of the gas mixture.

2. Process of claim 1 wherein the sewage is heated in the disinfection step at 55° C. to 65° C.

3. Process of claim 1 wherein the sewage is heated in the disinfection step for 12 to 36 hours.

4. Process of claim 2 wherein the sewage is heated in the disinfection step for 12 to 36 hours.

5. Process of claim 1 wherein the oxygen content of the gas mixture is 7 to 12%.

6. Process of claim 2 wherein the oxygen content of the gas mixture is 7 to 12%.

7. Process of claim 3 wherein the oxygen content of the gas mixture is 7 to 12%.

8. Process of claim 4 wherein the oxygen content of the gas mixture is 7 to 12%.

* * * * *